United States Patent [19]

Rigsby

[11] Patent Number: 4,804,442

[45] Date of Patent: Feb. 14, 1989

[54] ULTRAPURE HYDRAZINE PRODUCTION

[75] Inventor: James G. Rigsby, Lake Charles, La.

[73] Assignee: Olin Corporation, Cheshire, Conn.

[21] Appl. No.: 891,097

[22] Filed: Jul. 31, 1986

[51] Int. Cl.$^4$ ............................ B01D 3/10; B01D 3/34
[52] U.S. Cl. ........................................ 203/12; 203/37; 203/73; 423/407
[58] Field of Search ........................ 203/12, 36, 37, 91, 203/73; 159/47.1, DIG. 16; 202/205; 423/407

[56] References Cited

U.S. PATENT DOCUMENTS

| | | | |
|---|---|---|---|
| 2,690,378 | 9/1954 | Pennemen | 423/407 |
| 2,698,286 | 12/1954 | Bircher, Jr. | 423/407 |
| 2,740,692 | 4/1956 | Ryker et al. | 423/407 |
| 2,774,725 | 12/1956 | Swanson et al. | 203/12 |
| 2,799,631 | 7/1957 | Von Hessert et al. | 203/37 |
| 2,803,524 | 8/1957 | Deutschman, Jr. et al. | 423/407 |
| 4,013,758 | 3/1977 | Osborg | 423/407 |

FOREIGN PATENT DOCUMENTS

| | | | |
|---|---|---|---|
| 0599033 | 5/1960 | Canada | 203/12 |
| 0620713 | 3/1949 | United Kingdom | 423/407 |
| 0695264 | 8/1953 | United Kingdom | 423/407 |
| 0713792 | 8/1954 | United Kingdom | 423/407 |
| 0782060 | 8/1957 | United Kingdom | 423/407 |
| 0890240 | 2/1962 | United Kingdom | 423/407 |

OTHER PUBLICATIONS

Schmidt, E. W., *Hydrazine and Its Derivatives*, New York, Wiley-Interscience, 1984 pp. 73-84.

*Primary Examiner*—David L. Lacey
*Assistant Examiner*—V. Manoharan
*Attorney, Agent, or Firm*—James B. Haglind

[57] ABSTRACT

Ultrapure or anhydrous hydrazine is produced in a process which comprises distilling aqueous solutions of hydrazine having at least 70 percent by weight of $N_2H_4$ at pressures below about 20 millimeters. Aqueous solutions of hydrazine are dehydrated with solid inorganic compounds such as alkali metal hydroxides which are essentially carbon-free. The concentrated hydrazine solution is then distilled at reduced pressures and temperatures which minimize the hazardous conditions present when using processes of the prior art. Monopropellant hydrazine suitable for use in spacecraft engines can be produced having a $N_2H_4$ concentration of at least 99.5 percent and less than 5 parts per million of volatile carbonaceous materials.

7 Claims, No Drawings

ULTRAPURE HYDRAZINE PRODUCTION

The present invention is related to the purification of aqueous solutions of hydrazine. More particularly, the invention is related to the purification of aqueous solutions of hydrazine to produce anhydrous and ultra high purity hydrazine.

The use of anhydrous hydrazine in rocket propulsion has led to extensive investigations on methods for dehydration of the hydrazine solution produced by commercial processes. These efforts have been extensively reviewed by E. W. Schmidt on pages 73–84 of his publication "Hydrazine and Its Derivatives," New York, Wiley-Interscience, 1984.

The weak hydrazine solutions produced by commercial processes can be partially dehydrated by simple distillation wherein part of the water is removed therefrom to provide a constant boiling (at 118.5° C.) mixture or azeotrope of about 70 percent hydrazine and the balance water, i.e., 70.1 percent hydrazine and 29.9 percent water by weight. Additional water cannot be separated therefrom using the normal distillation procedures.

Aqueous solutions of hydrazine have been dehydrated using hygroscopic alkaline substances such as NaOH, BaO, KOH, etc. In the employment of one method, e.g., treatment with NaOH, as described in U.S. Pat. No. 2,740,692, issued Apr. 3, 1956 to D. W. Ryker et al, a quantity of solid NaOH is added to the hydrazine solution and the entire mixture is distilled. A small amount of a solution containing 95 percent hydrazine, with the balance being water, distills over first, followed by mixtures containing greater proportions of water. By repeating dehydration treatments such as this one several times, it is possible to obtain a solution having from 95 to 98 percent hydrazine and the balance water.

Anhydrous hydrazine has been produced by treating hydrazine hydrate with a fluid ("entrainer") that forms an azeotrope with water that boils at a temperature different from that of hydrazine or hydrazine hydrate. "Entrainers" have suitably been organic compounds such as aniline, benzene, pyridine, xylene, toluene, propyl alcohols, n-hexyl alcohol, cresol, glycol, glycol ethers and hexylamine, with aniline being used most frequently.

While the use of entrainers can produce anhydrous hydrazine having 99 percent or higher of $N_2H_4$, the organic impurities remaining prevent or limit its use in particular applications such as its use as a mono-propellant in engines for spacecrafts. Thus various methods have been developed to prepare ultrapure hydrazine from anhydrous hydrazine. One method developed by the Martin-Marietta Corporation employs a fractionated freezing process. Anhydrous hydrazine is frozen slowly at a temperature of 262±1K (13°±2° F.) to allow pure crystals to settle and the contaminants to accumulate in a supernatant fluid which is decanted. The pure hydrazine crystals are allowed to melt and are re-frozen. After three to four freeze-thaw cycles, the aniline content is reduced and the carbon content is lowered from approximately 7000 ppm to less than 20 ppm.

Ultrapure hydrazine can also be prepared by directional crystallization in which slow passage of the crystallization zone through a stirred sample in a large test tube takes place. The test tube is lowered into a cold bath at 223° K. Repetitive crystallization-separation-thaw cycles were able to produce hydrazine having a content up to 99.99 percent $N_2H_4$.

Other methods for producing low-impurity hydrazine include the use of ion exchange resins or absorbents such as activated alumina.

There is a need, however, for a process for producing ultrapure hydrazine directly from aqueous hydrazine solutions by a method which can be operated without requiring the use of entrainers, diluents, ion exchange resins, or other absorbents which introduce undesired impurities.

It is therefore a primary object of the present invention to provide a process for producing anhydrous and ultrapure hydrazine directly from aqueous hydrazine solutions.

A further object of the present invention is to provide a process which can be operated in the absence of entrainers, diluents, or absorbents for producing ultrapure hydrazine which can be used as a mono-propellant in spacecraft engines.

These and other objects of the invention are accomplished in a process for producing hydrazine containing at least 98 percent by weight of $N_2H_4$ which comprises distilling aqueous solutions of hydrazine having at least 70 percent by weight of $N_2H_4$ at pressures below about 20 millimeters of mercury.

The novel process of the present invention is adapted for use in purifying aqueous solutions having any suitable concentration of hydrazine and which are free, or contain low concentrations, of volatile carbonaceous materials as impurities. The term "volatile carbonaceous materials" as used herein refers to those carbonaceous impurities which would be carried over with the distillate. In accordance with the invention, where the $N_2H_4$ concentration is below about 70 percent, the solution is first concentrated by methods which avoid the use of carbon-containing materials. For example, the aqueous solution of hydrazine is dehydrated using as the dehydrating agent an inorganic compound such as an alkali metal hydroxide, an alkaline earth metal hydroxide, an alkaline earth metal oxide, and mixtures thereof. Preferably, the dehydration agent, in addition to water, will remove carbon dioxide or prevent its formation. For this reason, preferred as dehydrating agents are alkali metal hydroxides such as sodium hydroxide. Sodium hydroxide, preferably in solid form, is admixed with the hydrazine solution in amounts which are sufficient to remove water from the solution to provide an aqueous solution having a hydrazine concentration greater than about 70 percent by weight of $N_2H_4$. Suitable dehydrated hydrazine solutions contain from about 10 percent to about 25 percent of water by weight.

The concentrated hydrazine solution is then distilled under conditions which minimize the hazardous conditions which may be present when using processes of the prior art. The fractional distillation of the concentrated hydrazine is carried out at reduced pressures. These reduced pressures permit the fractionation to take place at low temperatures where hydrazine does not readily decompose in the absence of catalysts. Suitable pressures are those below about 20 millimeters of mercury, for example, in the range of from about 3 to about 15, and preferably in the range of from about 5 to about 10 millimeters of mercury. At these pressures the distillation temperatures employed are below about 50° C. and the novel process thus eliminates or clearly minimizes the dangers of explosions which are present in the processes of the prior art as discussed, for example, in the E. W. Schmidt's publication cited above.

The novel process of the present invention produces anhydrous hydrazine having a $N_2H_4$ concentration of at least 98 percent by weight and a concentration of volatile carbonaceous materials of less than about 500 parts per million.

Further, the process of the present invention, by employing hydrazine solutions initially having very low concentrations of volatile carbonaceous materials, for example, those produced in the Raschig process, produces ultra high purity hydrazine having a concentration of at least 99.5 percent, preferably 99.7 percent, and more preferably 99.8 percent by weight of $N_2H_4$ and less than about 5 parts per million of volatile carbonaceous materials.

In contrast to processes of the prior art, the novel process of the present invention allows neat hydrazine to be in contact with glass or metal surfaces without decomposing and accomplishes its production in the absence of diluents or additives.

The invention is further illustrated by the following example without any intention of being limited thereby. All parts and percentages are by weight unless otherwise specified.

EXAMPLE

A hydrazine solution (62.9 percent $N_2H_4$) was added to a three neck 3 liter boiling flask. Solid NaOH pellets were added to the hydrazine solution while stirring. After dissolution of the first batch of solid NaOH pellets, additional pellets were added in stages until the solution became saturated with NaOH at room temperature. An inclined condenser (cooled by a glycol solution at 10° C.) was attached to the middle neck of the flask and arranged so that the condensed liquid would drop into a 500 cc receiver. Vacuum was applied to the system via the product receiver and was maintained by use of a vacuum pump. The flask was slowly heated by a water bath to boil off the hydrazine contained in the flask. Several batches of hydrazine condensate (4997 grams) were collected in the receiver and by analysis averaged 90.4 percent $N_2H_4$. This hydrazine solution was added to a three neck, 12 liter boiling flask equipped with a stirring bar and a magnetic stirrer. The flask was placed in a warm water bath maintained between 30° and 40° C. An Oldershaw column having 20 trays was installed in the center neck. A vacuum distillation head that would allow variation of reflux to the column was installed at the top of the column. The vacuum was maintained at 6 mm. A reflux condenser was installed above the distilling head and was cooled by refrigerated glycol solution to maintain the temperature at 16°–19° C. The product analyzed by $KIO_3$ titration was 99.78 percent by weight of $N_2H_4$. By gas chromatographic (G. C.) analysis the $N_2H_4$ concentration of the solution was 99.9 percent. The G. C. Analysis using a flame ionization detection system did not detect any organic substances in the sample.

What is claimed is:

1. A process for producing ultrapure hydrazine from an aqueous solution of hydrazine which comprises:
    (a) dehydrating the aqueous solution of hydrazine by contact with an essentially carbon-free dehydrating agent to produce a concentrated aqueous hydrazine solution having a $N_2H_4$ concentration of at least 70 percent by weight,
    (b) distilling the concentrated hydrazine solution in a fractional distillation means at a pressure of less than about 20 millimeters of Hg to produce an ultra high purity hydrazine having a $N_2H_4$ concentration of at least 99.5 percent by weight and less than about 5 parts per million of volatile carbonaceous materials.

2. The process of claim 1 in which the distillation temperature is below about 50° C.

3. The process of claim 1 in which the dehydrating agent is an inorganic compound selected from the group consisting of alkali metal hydroxides, alkaline earth hydroxides, alkaline earth oxides, and mixtures thereof.

4. The process of claim 3 in which the dehydrating agent is an alkali metal hydroxide.

5. The process of claim 2 in which the pressure is from about 3 to about 15 millimeters of Hg.

6. The process of claim 5 in which the distillation temperature is from about 30° to about 40° C.

7. The process of claim 6 in which the hydrazine produced contains at least 99.7 percent by weight of $N_2H_4$.

* * * * *